US009692765B2

(12) United States Patent
Choi et al.

(10) Patent No.: US 9,692,765 B2
(45) Date of Patent: Jun. 27, 2017

(54) EVENT ANALYTICS FOR DETERMINING ROLE-BASED ACCESS

(71) Applicant: International Business Machines Corporation, Armonk, NY (US)

(72) Inventors: Christopher Y. Choi, Southport (AU); Rune H. Larsen, Allerod (DK); David P. Moore, Burleigh Waters (AU); Franz Wolfhagen, Stenlose (DK)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 14/464,796

(22) Filed: Aug. 21, 2014

(65) Prior Publication Data

US 2016/0057150 A1    Feb. 25, 2016

(51) Int. Cl.
H04L 29/06 (2006.01)
(52) U.S. Cl.
CPC .......... H04L 63/102 (2013.01); H04L 63/104 (2013.01); H04L 63/105 (2013.01)
(58) Field of Classification Search
CPC ..... H04L 63/00; H04L 63/08; H04L 63/0815; H04L 63/10; H04L 63/101; H04L 63/102; H04L 63/104; H04L 63/105; H04L 63/20; H04L 63/14; H04L 63/1408; H04L 63/1416; H04L 63/1425; G06F 21/00; G06F 21/30; G06F 21/50; G06F 21/60; G06F 21/604; G06F 21/62; G06F 21/6218
See application file for complete search history.

(56) References Cited

U.S. PATENT DOCUMENTS

| 7,631,362 | B2 | 12/2009 | Ramsey | |
|---|---|---|---|---|
| 8,479,302 | B1 | 7/2013 | Lin | |
| 9,166,993 | B1* | 10/2015 | Liu | H04L 63/1425 |
| 2004/0010591 | A1* | 1/2004 | Sinn | G06F 21/6227 |
| | | | | 709/225 |
| 2006/0282660 | A1* | 12/2006 | Varghese | G06Q 20/341 |
| | | | | 713/155 |
| 2007/0067853 | A1* | 3/2007 | Ramsey | G06F 21/316 |
| | | | | 726/28 |

(Continued)

OTHER PUBLICATIONS

Bijon et al., Risk-Aware Rbac Sessions, 2012, Springer-Verlag Berlin Heidelberg, ICISS 2012, LNCS 7671, pp. 59-71.*

(Continued)

*Primary Examiner* — Jung Kim
*Assistant Examiner* — Adrian Stoica
(74) *Attorney, Agent, or Firm* — Christopher McLane; Maeve M. Carpenter

(57) ABSTRACT

Embodiments of the present invention disclose a method, computer program product, and system for determining role-based access. In one embodiment, the method includes receiving an audit event for a restricted resource and a first user id associated with the audit event. The method further includes determining based at least in part on the audit event, a historical reference, the historical reference including at least one audit event associated with at least one user id. The method further includes determining access activity associated with the first user id. The method further includes determining based at least in part on the historical reference and the access activity, at least one recommended role for the first user id.

16 Claims, 4 Drawing Sheets

(56) References Cited

U.S. PATENT DOCUMENTS

| | | | |
|---|---|---|---|
| 2007/0143827 A1* | 6/2007 | Nicodemus | G06F 21/6218 726/2 |
| 2008/0028453 A1 | 1/2008 | Nguyen et al. | |
| 2008/0288330 A1* | 11/2008 | Hildebrand | G06Q 10/06 705/7.28 |
| 2010/0100941 A1* | 4/2010 | Eom | G06F 21/6218 726/4 |
| 2011/0004580 A1* | 1/2011 | Varghese | G06N 99/005 706/47 |
| 2013/0227712 A1 | 8/2013 | Salem et al. | |
| 2014/0317691 A1* | 10/2014 | Zombik | H04L 41/28 726/4 |
| 2016/0026717 A1* | 1/2016 | Kelsey | G06F 17/30867 707/754 |

OTHER PUBLICATIONS

Bijon et al. A Framework for Risk_Aware Role Based Access Control, 2013, IEEE, 6th Symposium on Security Analytics and Automation, pp. 462-469.*

Buecker, Axel et al.; "Integrated Identity and Access Management Architectural Patterns"; IBM Redpaper; Copyright IBM Corp. 2008.

IBM; "System and Method for detecting suspicious identities"; original publication date Dec. 8, 2009; IPCOM000190612D.

"Design and implement just-in-time provisioning with SAML 2.0"; Aug. 14, 2012; <http://www.ibm.com/developerworks/library/se-jitp/>.

* cited by examiner

EVENT ANALYTICS FOR DETERMINING
ROLE-BASED ACCESS

BACKGROUND OF THE INVENTION

The present invention relates generally to the field of identity management, and more particularly to event analytics for role-based access provisioning.

Work environments are becoming increasingly dynamic, utilizing enterprise computing environments to provide a communication path and services between users, computing systems, processes, applications, services, and networks, to satisfy the needs of the organization. Enterprise computing environments may include restricted resources, which contain confidential or personal information, protected by law or policy whose unauthorized disclosure could have severe or catastrophic effects. Controlling user access to an enterprise computing environment with restricted resources can be vital, and provisions to ensure confidentiality and protection of information are required. Typically, user access is controlled through a login in which access is granted to the enterprise computing environment through credentials and the assignment of roles (roles may also be referred to as permissions, access rights, and/or privileges). Roles can be automatic, granted, or applied for and control the ability of a user to view or make changes to an accessed resource. To facilitate this process within an enterprise computing environment, identity management systems, products, applications, and platforms are utilized. An identity management system is an administrative function that pertains to controlling aspects associated with a user (e.g., authentication, authorization, roles, etc.) within the enterprise computing environment.

Identity management consists primarily of three functions: pure identity, user access (i.e., logon), and service. Pure identity functions pertain to the creation, management, and deletion of identities without regard to access or entitlements. User access functions pertain to the created identity (i.e., specific digital identity) and the associated data allowing the user access to a service or services across applications, which enables access controls to be assigned and evaluated against this identity. Service functions deliver personalized, role-based services to users and associated devices. Additionally, identity management controls user data such as, authentication, authorization, and roles. Authentication is the verification that an entity is who/what it claims to be using a password, biometrics (e.g., fingerprints), or distinctive behavior (e.g., gesture pattern on a touchscreen). Authorization manages the information that defines what operations an entity can perform in the context of specific application. Roles assign varying levels of access within the enterprise environment to a particular job or job function according to job competency, authority, and responsibility.

SUMMARY

Embodiments of the present invention disclose a method, a computer program product, and a computer system for determining role-based access. The method includes one or more computer processors receiving an audit event for a restricted resource and a first user id associated with the audit event. The method further includes one or more computer processors determining based at least in part on the audit event, a historical reference; the historical reference including at least one audit event associated with at least one other user id. The method further includes one or more computer processors determining access activity associated with the first user id. The method further includes one or more computer processors determining based at least in part on the historical reference and the access activity, at least one recommended role for the first user id.

DETAILED DESCRIPTION

Organizations deploy identity management processes or systems, primarily to grant appropriate access rights to users and other entities, via a specific identity rather than to manage a set of identities. Role-based access control is used in enterprise security and identity management products offering a way to tie access entitlements to business function, reduce the number of relationships to be managed, and make administration of access rights simpler. In role-based access control, roles can be created, changed, or discontinued as the needs of the enterprise system evolve. Processes such as role or data mining discover relationships between users based on similar access permissions that can logically be grouped to form a role. While effective, role mining and role definition can be costly and impractical to perform on new employees. When role-based access control is not implemented, over and under provisioning of accesses may result and involves manually requesting additional accesses and/or recertification of existing users.

As recognized by embodiments of the present invention, identity management systems strive to increase security and productivity while decreasing cost, downtime, and repetitive tasks. Embodiments of the present invention provide the ability to determine roles for a new user based on similarities among existing users with access to various resources and usage of the resources. Additionally, embodiments of the present invention create access requests to the identity management system for submission by a user attempting to access a previously un-provisioned resource (i.e., user does not have a role granting access). Embodiments of the present invention also monitor and store existing user id access activity to the provisioned resource (i.e., user currently has a role allowing access). Embodiments of the present invention may compare the existing user id activity against criteria, such as previous user id activity, a pre-determined threshold (e.g., minimum activity requirement), and with respect to compliance with policy rules to ensure security by automatically suspending or de-provisioning the roles of a user when criteria is not sustained.

Figure 1:
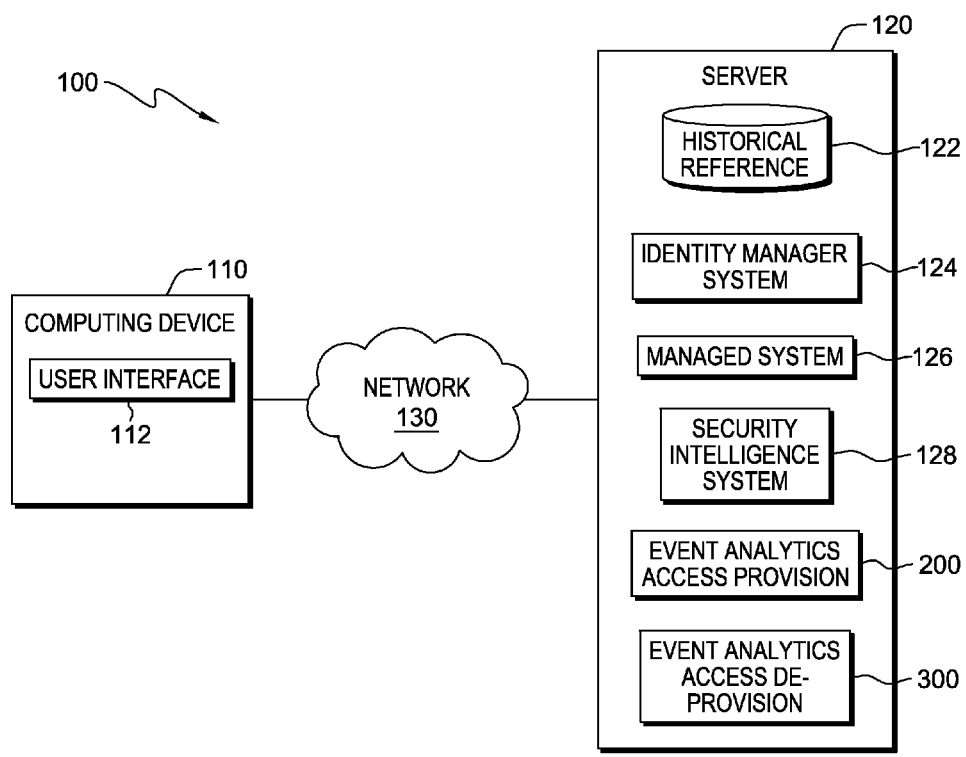
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment 100, in accordance with one embodiment of the present invention. FIG. 1 provides only an illustration of one embodiment and does not imply any limitations with regard to the environments in which different embodiments may be implemented.

In the depicted embodiment, distributed data processing environment 100 includes computing device 110 and server 120 interconnected over network 130. Distributed data processing environment 100 may include additional computing devices, mobile computing devices, servers, computers, storage devices, or other devices not shown.

Network 130 may be a local area network (LAN), a wide area network (WAN) such as the Internet, a wireless local area network (WLAN), any combination thereof, or any combination of connections and protocols that will support communications between computing device 110, server 120, and other computing devices and servers (not shown), in accordance with embodiments of the inventions. Network 130 may include wired, wireless, or fiber optic connections.

Computing device 110 may be a web server, or any other electronic device or computing system, capable of processing program instructions and receiving and sending data. In some embodiments, computing device 110 may be a laptop computer, a tablet computer, a netbook computer, a personal computer (PC), a desktop computer, a personal digital assistant (PDA), a smart phone, or any programmable electronic device capable of communicating with network 130. In other embodiments, computing device 110 may represent a server computing system utilizing multiple computers as a server system, such as in a cloud computing environment. In general, computing device 110 is representative of any electronic device or combination of electronic devices capable of executing machine readable program instructions, as described in greater detail with regard to FIG. 4, in accordance with embodiments of the present invention. Computing device 110 contains user interface 112.

User interface 112 operates on computing device 110 to generate display signals corresponding to content, such as windows, menus, and icons and to receive various forms of user input. User interface 112 may comprise one or more interfaces, such as an operating system interface and/or an application interface. In one embodiment, user interface 112 comprises an interface to identity manager system 124. In another embodiment, user interface 112 comprises an interface to managed system 126. In some embodiments, user interface 112 comprises an interface to security intelligence system 128. In some other embodiment, user interface 112 comprises an interface to event analytics access provision 200 and/or event analytics access de-provision 300. User interface 112 may display data received from identity manager system 124, managed system 126, security intelligence system 128, event analytics access provision 200, and event analytics access de-provision 300.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with computing device 110 over network 130. In other embodiments, server 120 may represent a server computing system utilizing multiple computers as a server system, such as in a cloud computing environment. Server 120 contains historical reference 122, identity manager system 124, managed system 126, security intelligence system 128, event analytics access provision 200, and event analytics access de-provision 300.

Historical reference 122 is a collection of individual user data stored on server 120 for analytical purposes. Historical reference 122 includes individual user data (e.g., username, roles, department, manager, job id, usage, etc.). Historical reference 122 can be implemented with any type of storage device that is capable of storing data that may be accessed and utilized by event analytics access provision 200. In one embodiment, historical reference 122 resides on server 120. In another embodiment, historical reference 122 resides on computing device 110. In other embodiments, historical reference 122 may reside on another server or another computing device connected over network 130, provided that historical reference 122 is accessible to security intelligence system 128, event analytics access provision 200, and event analytics access de-provision 300.

Identity manager system 124 is a software system capable of supporting centralized management of user accounts. Identity manager system 124 includes software to support administrative tasks related to user access and applications (e.g., access requests, password capabilities, policy role-based provisioning across systems and applications). Identity manager system 124 is accessed by security intelligence system 128, event analytics access provision 200, and event analytics access de-provision 300 upon receiving an access request from a user through user interface 112. Identity manager system 124 provides user provisioning information to managed system 126 upon receiving an access request. In one embodiment, identity manager system 124 resides on server 120. In another embodiment, identity manager system 124 resides on computing device 110. In other embodiments, identity manager system 124 may reside on another server or another computing device connected over network 130, provided identity manager system 124 is accessible to user interface 112, managed system 126, security intelligence system 128, event analytics access provision 200, and event analytics access de-provision 300.

Managed system 126 is a restricted resource within an enterprise system supporting one or more business functions or applications. Software components may be a software package, service, resource, or module that encapsulates a set of related functions or data. In the present embodiment, managed system 126 is a restricted resource requiring a user have permission to access the resource (i.e., access to the resource is controlled through a login). Managed system 126 can be accessed via a user request through user interface 112 and by identity manager system 124. Managed system 126 provides audit event information (e.g., failed user access attempts due to insufficient permissions, successful user access attempts) to security intelligence system 128. In one embodiment, managed system 126 resides on server 120. In another embodiment, managed system 126 resides on computing device 110. In other embodiments, managed system 126 may reside on another server or another computing device connected over network 130, provided that managed system 126 is accessible to user interface 112, identity manager system 124, security intelligence system 128, event analytics access provision 200, and event analytics de-provision 300.

Security intelligence system 128 is a software system which monitors and records activity for a network and one or more application events operating within the enterprise environment. Security intelligence system 128 supports the capability to correlate activities performed within the enterprise environment to specific user ids. Security intelligence system 128 may identify risks through unusual patterns of access associated with a user id accessing managed system 126. In one embodiment security intelligence system 128 may include event analytics access provision 200 and event analytics access de-provision 300. In some embodiments, security intelligence system 128 resides on server 120. In another embodiment, security intelligence system 128 resides on computing device 110. In other embodiments, security intelligence system 128 may reside on another server or another computing device connected over network 130, provided that security intelligence system 128 is accessible to user interface 112, identity manager system 124, managed system 126, event analytics access provision 200, and event analytics access de-provision 300.

Event analytics access provision 200 is a software component which assists in determining and acquiring appropriate user id access to a restricted resource. Event analytics access provision 200 may determine correct user provisioning based on roles and/or usage. Event analytics access provision 200 determines the validity of a user request to access the restricted resource and may generate and submit a user request to identity manager system 124. In one embodiment, event analytics access provision 200 resides on server 120. In another embodiment, event analytics access provision 200 resides on computing device 110. In some other embodiment, event analytics access provision 200 may be included within security intelligence system 128. In other embodiments, event analytics access provision 200 may reside on another server or another computing device connected over network 130, provided that event analytics access provision 200 is accessible to identity manager system 124, managed system 126, and security intelligence system 128.

Event analytics access de-provision 300 is a software component which evaluates existing user id access activity to a restricted resource and initiates appropriate access changes for the existing user when user id access activity is determined atypical. Event analytics access de-provision 300 may determine correct user provisioning and/or de-provisioning based on roles and/or usage. In one embodiment, event analytics access de-provision 300 may determine the correct user roles and access rights are currently implemented and no changes are made. In some other embodiments, event analytics access de-provision 300 may determine existing user id access activity is atypical and recommend de-provisioning the existing user id. Event analytics access de-provision 300 may generate and submit a request to identity manager system 124 to change, suspend, or remove access for an existing user id. In one embodiment, event analytics access de-provision 300 resides on server 120. In another embodiment, event analytics access de-provision 300 resides on computing device 110. In some other embodiment, event analytics access de-provision 300 may be included within security intelligence system 128. In some other embodiment, event analytics access de-provision 300 may be included within event analytics access provision 200. In yet another embodiment, event analytics access de-provision 300 may reside on another server or another computing device connected over network 130, provided that event analytics access de-provision 300 is accessible to identity manager system 124, managed system 126, and security intelligence system 128.

Figure 2:
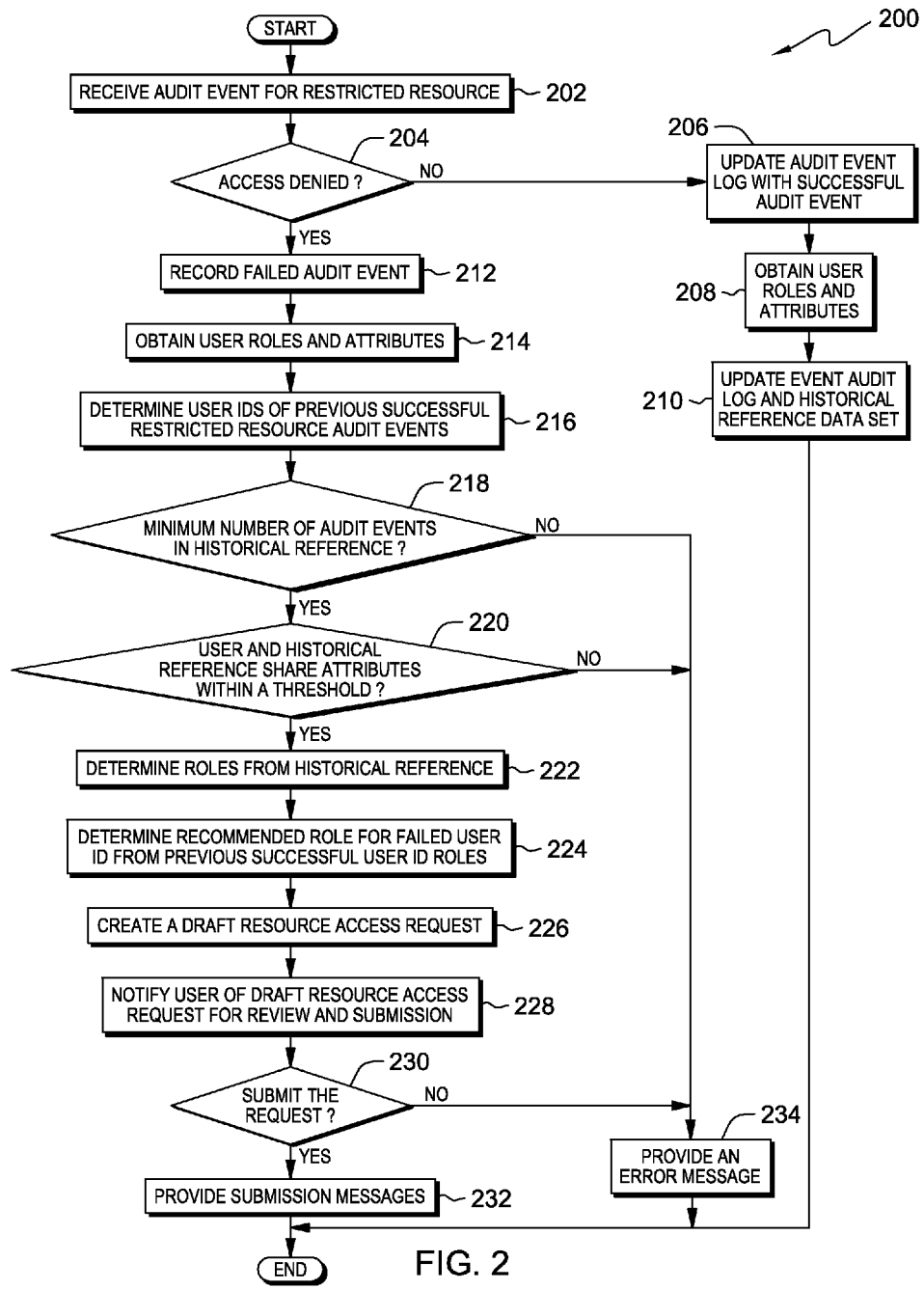
FIG. 2 is a flowchart depicting operational steps of an event analytics access provision on a server computer within the distributed data processing environment of FIG. 1 for determining account access after an unauthorized access attempt, in accordance with an embodiment of the present invention.

FIG. 2 is a flowchart depicting operational steps of event analytics access provision 200, executing within the distributed data processing environment 100 of FIG. 1, in accordance with an embodiment of the present invention. Event analytics access provision 200 initiates upon receipt of an audit event (e.g., successful login, failed login attempt) to a restricted resource, such as managed system 126. Audit events refer to activities and operations that can potentially access or alter data which may be recorded and monitored (e.g., accessing information, altering data, granting user access, running utilities, etc.). Event analytics access provision 200 accesses identity manager system 124, security intelligence system 128, and historical reference 122 to determine roles for a user after an audit event through role-based provisioning. In one embodiment, event analytics access provision 200 determines roles for a user of restricted resources. In another embodiment, event analytics access provision 200 is unable to determine user roles.

In step 202, event analytics access provision 200 receives an audit event for a restricted resource. In an embodiment, event analytics access provision 200 initiates in response to receipt of an audit event created when a user attempts to access managed system 126 through user interface 112. Event analytics access provision 200 receives a notification of an audit event (e.g., login attempt, authorization event) from managed system 126. In one embodiment, event analytics access provision 200 receives a notification of a successful audit event (e.g., access granted). In another embodiment, event analytics access provision 200 receives a notification of a failed audit event (e.g., user id not recognized, unsuccessful login, authorization failure).

In decision 204, event analytics access provision 200 determines if access was denied. Event analytics access provision 200 determines if the audit event failed (e.g., unsuccessful login, user id not recognized) or if the audit event was successful (e.g., login was granted). If event analytics access provision 200 determines a failed audit event (decision 204, yes branch), event analytics access provision 200 records a failed audit event in security intelligence system 128 (step 212). If event analytics access provision 200 determines a successful audit event (decision 204, no branch), event analytics access provision 200 updates a system that records activity within the enterprise environment, for example, security intelligence system 128 within distributed data processing environment 100, with a successful audit event (step 206).

In step 206, event analytics access provision 200 updates an audit event log with a successful audit event. In one embodiment, event analytics access provision 200 updates security intelligence system 128 with a successful audit event. For example, an existing user id requests access to managed system 126. Upon entering a valid user id and password, access to the system is granted (i.e., user id exists, authentication and authorization criteria are met, and assigned role grants access to restricted resource). Manager system 126 creates and sends a successful audit event to event analytics access provision 200. Event analytics access provision 200 records the successful access audit and user id in the audit event log within security intelligence system 128.

In step 208, event analytics access provision 200 obtains user roles and attributes. Event analytics access provision 200 queries identity manager system 124 for the roles and attributes associated with the user id of the successful audit event. Users are assigned roles (i.e., groups of operations) which are often related to a particular job or function. For example, a system administrator role might be authorized to reset a user's password, add computer software, and access information on a computing device, whereas a new employee is assigned a general user role which might only have the ability to access information on the computing device. User attributes describe properties associated with a user id (e.g., name, department, manager, job code, etc.). Event analytics access provision 200 receives the associated user roles and attributes from identity manager system 124 in response to the query request.

In step 210, event analytics access provision 200 updates an audit event log and historical reference 122. The audit event log collects and saves security log entries across an organization and may contain information about actions that take place on a computer, computers, and/or network which can be correlated to a user id. Event analytics access provision 200 updates the audit event log with the user roles and attributes within, for example, security intelligence system 128, for correlation with user actions taken on managed system 126 by the user id. Event analytics access provision 200 updates historical reference 122 with the user id and associated roles and attributes for future analysis of audit events. Event analytics access provision 200 completes upon updating historical reference 122 as access to managed system 126 currently exists.

In step 212, event analytics access provision 200 records the failed audit event. In one embodiment, event analytics access provision 200 records the failed audit event (e.g., user id not recognized, incorrect password) with the corresponding user id in security intelligence system 128. For example, a new employee requests access to managed system 126. Upon entering a user id and passwords, access to the system is denied (i.e., user id is not found within user ids granted access, user id is missing appropriate authorizations). Managed system 126 creates and sends a failed audit event to event analytics access provision 200. In an embodiment, event analytics access provision 200 records the failed audit event and user id in the audit event log within security intelligence system 128.

In step 214, event analytics access provision 200 obtains the user roles and attributes associated with the user id. In one embodiment, event analytics access provision 200 obtains the user roles and attributes from identity manager system 124. Event analytics access provision 200 queries identity manager system 124 for the roles and attributes associated with the user id from the failed audit event for additional user information. Event analytics access provision 200 receives roles (e.g., other restricted resource permissions) and attributes (e.g., user id, department, manager, job title, etc.) from identity manager system 124. In one embodiment, event analytics access provision 200 receives additional roles for a user id from identity manager system 124 (i.e., the user id has access to other restricted resources). In some other embodiment, event analytics access provision 200 does not receive roles for a user id from identity manager system 124 (i.e., the user id does not have access to any restricted resources, such as a new employee).

In step 216, event analytics access provision 200 determines the user ids of previous successful restricted resource audit events. Event analytics access provision 200 queries identity manager system 124 for the user ids associated with access to managed system 126 (i.e., user ids which have roles granting access to managed system 126). Event analytics access provision 200 searches historical reference 122 for successful audit events for the identified user ids from identity manager system 124. In one embodiment, event analytics access provision 200 retrieves one or more user ids associated with successful audit events from historical reference 122. In some other embodiment, event analytics access provision 200 may not retrieve any user ids from within historical reference 122 (i.e., there are no successful audit events for managed system 126 within historical reference 122).

In decision 218, event analytics access provision 200 determines if a minimum number of audit events in historical reference 122 has been met. The minimum number of audit events is a defined threshold of user audit events (e.g., constant value, percentage, role specific, attribute specific, etc.) set by a restricted resource owner for the enterprise environment to ensure sufficient data is available to assist in determining new user roles and access. Event analytics access provision 200 determines if the minimum number of audit events in historical reference 122 has been met based upon a defined threshold. For example, a new user fails to access a restricted resource, the minimum threshold is 10, and there are three stored audit events. Event analytics access provision 200 determines there is not enough data available to correctly determine roles and access for the new user. In one embodiment, event analytics access provision 200 determines the number of audit events identified within historical reference 122 are equal to or exceed the minimum defined threshold. In some other embodiment, event analytics access provision 200 determines the number of audit events identified within historical reference 122 are less than the minimum defined threshold.

If event analytics access provision 200 determines the minimum number of audit events from historical reference 122 is met (decision 218, yes branch), event analytics access provision 200 continues to decision 220. If event analytics access provision 200 determines the minimum number of audit events from historical reference 122 is not met (decision 218, no branch), event analytics access provision 200 continues to step 234 and provides an error message. In one embodiment, event analytics access provision 200 creates a log file with the error information. In another embodiment, event analytics access provision 200 provides feedback to the user in the form of an error message that the resource access request was unable to be completed due to insufficient information in historical reference 122. In some other embodiment, event analytics access provision 200 provides details on how to manually request access to managed system 126. In another embodiment, event analytics access provision 200 does not provide an error message.

In decision 220, event analytics access provision 200 determines if the user shares attributes with the determined successful user ids from historical reference 122 within a threshold. Event analytics access provision 200 compares the attributes of the user id associated with the failed audit event with the attributes of the user ids and successful audit events from historical reference 122. Event analytics access provision 200 identifies, if possible, shared attributes between the failed user id and the successful user ids from historical reference 122 (e.g., same job title, same department, same manager, etc.) Event analytics access provision 200 determines if the identified shared attributes associated with the failed and successful user ids meet a pre-defined minimum threshold (i.e., the user shares a pre-determined number of attributes with the successful audit events).

If event analytics access provision 200 determines the user and the determined successful user ids from historical reference 122 share attributes within the threshold (decision 220, yes branch), event analytics access provision 200 continues to step 222. If event analytics access provision 200 determines the user and the determined successful user ids from historical reference 122 do not share attributes within the threshold (decision 220, no branch), event analytics access provision 200 continues to step 234 and provides an error message. In one embodiment, event analytics access provision 200 creates a log file with the error information. In another embodiment, event analytics access provision 200 provides feedback to the user in the form of an error message that the resource access request was unable to be completed due to not meeting the minimum shared attribute threshold. In some other embodiment, event analytics access provision 200 provides details on how to manually request access to managed system 126.

In step 222, event analytics access provision 200 determines roles from historical reference 122. Event analytics access provision 200 determines roles associated with determined shared attributes user ids from historical reference 122. Event analytics access provision 200 queries historical reference 122 for the roles associated with the shared attribute user ids from historical reference 122. Event analytics access provision 200 retrieves the roles associated with the shared attributes user ids from historical reference 122.

In step 224, event analytics access provision 200 determines a recommended role for the failed user id from previous successful user id roles. In an embodiment, event analytics access provision 200 determines new roles for the failed user id through a comparison of the roles determined in step 214 above and the roles associated with the user with the successful user ids and shared attributes. In one embodiment, event analytics access provision 200 determines an exact match of attributes between the failed user id and a successful user id within historical reference 122 (i.e., user shares the same attributes with at least one user within historical reference 122). For example, a new employee shares the same job title, manager, and department as a co-worker within historical reference 122 with access to managed system 126. Event analytics access provision 200 determines the user id associated with the new employee has not been provided a role with access to managed system 126, which the co-worker listed in historical reference 122 is assigned. Event analytics access provision 200 determines the new employee user id should be assigned an identical role as the shared matching user id from historical reference 122. In some other embodiment, event analytics access provision 200 determines a partial match within historical reference 122 between the failed user id and successful user ids within historical reference 122. For example, a new employee may share the same department and manager with user ids in historical reference 122 but does not share the same job level. Event analytics access provision 200 determines the user id associated with the new employee has not been provided access to managed system 126, but the partial matches from historical reference 122 may have multiple roles (i.e., different access rights to managed system 126). Event analytics access provision 200 may be unable to determine an exact role and associates all known roles from the partial attribute matches as potential role assignments.

In step 226, event analytics access provision 200 creates a draft resource access request. Event analytics access provision 200 creates a draft resource access request based on the information acquired by comparing the roles of the failed user id with the roles of the successful user ids from historical reference 122. Event analytics access provision 200 may include provisioning recommendations and recommended roles. In one embodiment, event analytics access provision 200 creates a draft resource access request for the addition of access to managed system 126 with a specific recommended role. For example, the new employee matches the same identified key attributes as a co-worker; therefore, the draft resource access request recommendation matches the role of the co-worker in historical reference 122. In some other embodiment, event analytics access provision 200 creates a draft resource access request for the addition of access to managed system 126 with multiple potential recommended roles. For example, the new employee does not share the same job level with the successful user ids identified in historical reference 122. The user ids identified in historical reference 122 are above or below the job level of the new employee and have varying degrees of accessibility to managed system 126. Event analytics access provision 200 creates an ordered resource access request listing the various potential roles for the new employee based on the roles from historical reference 122 (i.e., filtered and ranked listing based on accesses of similar users, such as team members or users with a same manager).

In step 228, event analytics access provision 200 notifies the user of the draft resource access request for review and submission. In one embodiment, event analytics access provision 200 notifies the user the draft resource access request has been created for identity manager system 124 on their behalf and requires review and final submittal. In another embodiment, identity manager system 124 may notify the user that the draft resource access request has been created on their behalf and requires review and final submittal. In one embodiment, a user approves the created draft resource access request, and event analytics access provision 200 submits without changes to identity manager system 124 (e.g., only one role was listed). In another embodiment, a user modifies the draft resource access request (e.g., selects a role from the suggested list provided, requests a new role not listed), and event analytics access provision 200 submits the modified resource access request to identity manager system 124. In some other embodiment, the user approves the draft resource access request with a list of recommended roles, events analytics access provision 200 submits the access request to identity manager system 124 for the resource owner to determine role assignment. In yet another embodiment, the user cancels the draft resource access request, and event analytics access provision 200 does not submit a request to identity manager system 124.

In decision 230, event analytics access provision 200 determines if the user submits a request. If event analytics access provision 200 determines the user selects to submit the resource access request (decision 230, yes branch), event analytics access provision 200 submits the request and continues to step 232. If event analytics access provision 200 determines the user selects to cancel the submission of the resource access request (decision 230, no branch), event analytics access provision 200 continues to step 234 and provides an error message stating the resource access request was canceled. In another embodiment, identity manager system 124 determines if the user submits a request.

In step 234, event analytics access provision 200 provides an error message. In one embodiment, event analytics access provision 200 creates a log file message with the error information. In another embodiment, event analytics access provision 200 provides an error message on user interface 112. In some other embodiment, event analytics access provision 200 provides an error message via e-mail to the e-mail address associated with the user id requesting access to managed system 126. In yet another embodiment, event analytics access provision 200 provides feedback informing a user how to manually request access to managed system 126.

In step 232, event analytics access provision 200 provides a submission message. In one embodiment, event analytics access provision 200 provides a successful submission message on user interface 112. In another embodiment, event analytics access provision 200 provides a successful submission message to the e-mail address associated with the user id requesting access to managed system 126. In some other embodiment, event analytics access provision 200 provides a submission message to the resource owner indicating a review is required for a resource access request to identity manager system 124 for managed system 126. In yet some other embodiment, event analytics access provision 200 provides a submission message to multiple user ids (e.g., resource owner, requester, managers) through combinations of the aforementioned notifications or through other notification methods not mentioned.

Upon completion of event analytics access provision 200, the resource owner of identity manager system 124 performs manual actions in order for role assignments to be implemented for a user id. In one embodiment, the resource owner, upon review of the recommendations made by event analysis access provision 200, approves the resource access request. Identity manager system 124 updates the user id with the new role assignment. In another embodiment, the resource owner, upon review of the request and recommendations made by event analytics access provision 200, modifies the resource access request and assigns a new role based on the submitted recommended role list. Identity manager system 124 updates the user id with the revised role assignment. In some other embodiment, the resource owner, upon review of the request and recommendations made by event analysis provision 200, denies the resource access request. In one embodiment, identity manager system 124 provides a rejection notification of the resource access request. In another embodiment, identity manager system 124 provides an approved notification of the resource access request.

Figure 3:
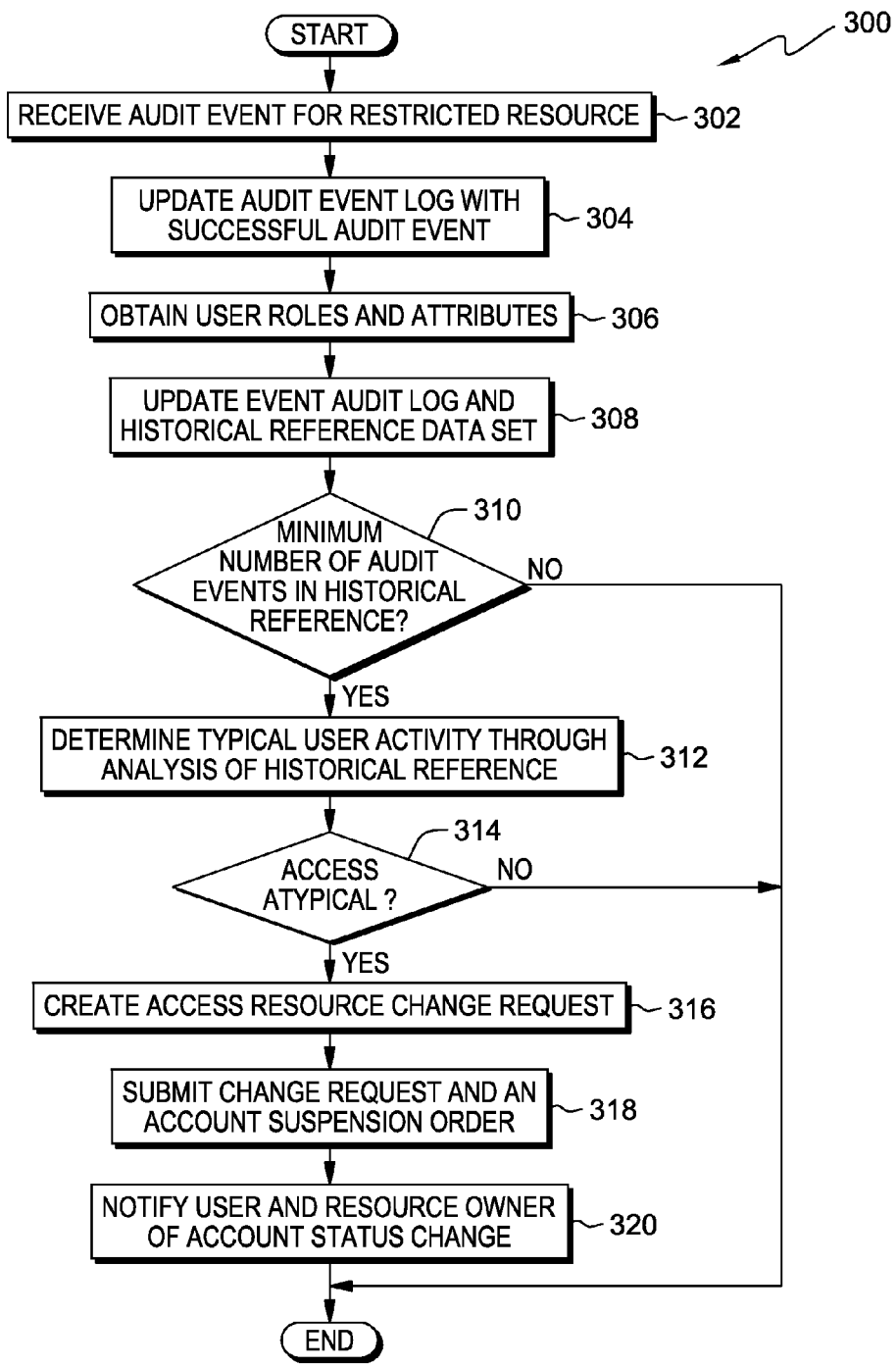
FIG. 3 is a flowchart depicting operational steps of an event analytics access de-provision on a server computer within the distributed data processing environment of FIG. 1 for determining account access suspension after a deviation from normal usage, in accordance with an embodiment of the present invention.

FIG. 3 is a flowchart depicting operational steps of event analytics access de-provision 300 for evaluating and modifying existing user access (e.g., suspension of access, revoking access, changing roles) executing within the distributed data processing environment 100 of FIG. 1, in accordance with an embodiment of the present invention. In the depicted embodiment as shown in FIG. 3, an existing user id's role assignment grants access to managed system 126, but the user id may no longer require the current access provided by the assigned role. For example, a user may only access managed system 126 when required to change a password but does not utilize available resources. The current role and access for the user id can be evaluated to determine the actual user id needs to maintain optimal security on managed system 126. Event analytics access de-provision 300 initiates upon receipt of an audit event (e.g., successful login, failed login attempt, change password request) to a restricted resource, for example, managed system 126.

Steps 302 through 308 of event analytics access de-provision 300 operate similarly or in tandem to embodiments described above in FIG. 2 with regard to respective steps 202 through 210 (following decision 204, no branch) of event analytics access provision 200. In an example, event analytics access de-provision 300 receives a successful audit event and associated roles and attributes for the user id associated with the audit event from managed system 126 and identity manager system 124 respectively. Event analytics access de-provision 300 updates security intelligence system 128 and historical reference 122 with the received information regarding the successful audit event and associated user id information. Below follows a discussion of the remaining steps of an embodiment of event analytics access de-provision 300.

In decision 310, event analytics access de-provision 300 determines if the minimum number of audit events in historical reference 122 has been met. Event analytics access de-provision 300 determines if historical reference 122 contains the minimum number of audit events based upon a defined threshold for user id activity analysis. As discussed above with reference to FIG. 2, the minimum number of audit events can be set by a restricted resource owner for the enterprise environment to ensure sufficient data is available. In one embodiment, event analytics access de-provision 300 determines the number of audit events identified within historical reference 122 are equal to or exceed the minimum defined threshold. In some other embodiment, event analytics access de-provision 300 determines the number of audit events identified within historical reference 122 are less than the minimum defined threshold.

If event analytics access de-provision 300 determines the minimum number of audit events from historical reference 122 is met (decision 310, yes branch), event analytics access de-provision 300 continues to step 312. If event analytics access de-provision 300 determines the minimum number of audit events from historical reference 122 is not met (decision 310, no branch), event analytics access de-provision 300 completes, and user id roles remain unchanged.

In step 312, event analytics access de-provision 300 determines typical user id activity through analysis of historical reference 122. In one embodiment, typical user id activity refers to actual recorded audit event activity for a user id matching an expected defined activity. Typical user id activity may vary depending on policy rules for managed system 126 and assigned user roles. Policy rules are a set of rules applied by the resource owner which define the ways in which the restricted resource may be used. Event analytics access de-provision 300 queries historical reference 122 for previous instances of the user id associated with the audit event accessing managed system 126. In one embodiment, event analytics access de-provision 300 receives the user id audit event information from historical reference 122 (e.g., last access attempt, audit event types, duration of access, frequency of access etc.). In some other embodiment, event analytics access de-provision 300 receives the user id audit event information from security intelligence system 128. Additionally, event analytics access de-provision 300 queries historical reference 122 for audit event information associated with other user ids accessing managed system 126 as a reference for additional typical user id activity. Event analytics access de-provision 300 sorts the received audit event information based on similar roles and attributes as the user id associated with the audit event. In one embodiment, event analytics access de-provision 300 identifies a match within the received audit event information. In another embodiment, event analytics access de-provision 300 identifies audit events associated with similar roles and attributes. In an embodiment, event analytics access de-provision 300 organizes audit event information based on similar roles and attributes starting with the most to least similar attribute and/or role matches.

In decision 314, event analytics access de-provision 300 determines if access is atypical. In one embodiment, atypical activity refers to the actual recorded audit event activity for a user id not matching an expected defined activity for the user id. For example, an atypical activity may include one user id accessing managed system 126 once every six months to change a password while other user ids access managed system 126 daily. In another embodiment, atypical activity refers to a user id utilizing managed system 126 in a manner in violation of the policy rules. For example, a user id attempts to access prohibited web sites through managed system 126, (i.e., policy rules restrict those web sites) and event analytics access de-provision 300 identifies the activity as atypical. In some other embodiment, event analytics access de-provision 300 compares the user id audit event information to the ordered ranking of similar audit events, which are ranked based on similar roles and attributes with the user id, from historical reference 122 to determine atypical access within a threshold. For example, event analytics access de-provision 300 compares the number of audit events and type of audit events (e.g., account maintenance, resource access) between the user id and the ordered list. Event analytics access de-provision 300 determines access is atypical if the results of the most similar comparison are below a set threshold as defined by the resource owner. Event analytics access de-provision 300 determines access is not atypical (i.e., the access activity is aligned with the expected defined activity for the role associated with the user id) if the results of the comparison match or exceed the set threshold (i.e., user id from audit event has a number of similar audit events matching historical reference 122 audit events which meet the threshold requirements). Thresholds define minimum access requirements to maintain access, which may vary based upon policy rules for managed system 126 and an assigned role. For example, a system administrator role may be anticipated to access managed system 126 twice a month for maintenance events whereas a general user id role is anticipated to access the managed system 126 resource weekly to perform data entry.

If event analytics access de-provision 300 determines the access is atypical (decision 314, yes branch), event analytics access de-provision 300 continues to step 316. If event analytics access de-provision 300 determines the access is not atypical (decision 314, no branch), event analytics access de-provision 300 completes and user id roles remain unchanged.

In step 316, event analytics access de-provision 300 creates an access resource change request. Event analytics access de-provision 300 creates an access resource change request for the user id associated with the audit event. Event analytics access de-provision 300 includes the results of the comparison from decision 314 in the access resource change request for identity manager system 124. In some embodiments, event analytics access de-provision 300 may also include a recommended permanent action (e.g., change of user id role, remove access) to identity manager system 124.

In step 318, event analytics access de-provision 300 submits the access resource change request and an account suspension order. In various embodiments, event analytics access de-provision 300 provides identity manager system 124 with an instruction to suspend access of a specific user (i.e., changes user id access authorization to suspended status) pending resource owner action. In one embodiment, in response to receipt of the suspension order, identity manager system 124 temporarily automatically suspends access to managed system 126 for the user id associated with the audit event. In another embodiment, the user id associated with the audit event maintains access to managed system 126 until identity manager system 124 receives input from the resource owner in response to the receipt of a suspension order. De-provisioning user id access (i.e., total removal of a user id for a restricted resource) is a resource owner action through identity manager system 124 which may occur after receipt and review of the access resource change request by the resource owner.

In step 320, event analytics access de-provision 300 notifies the user and the resource owner of an account status change. In one embodiment, event analytics access de-provision 300 displays a message at the time of login to managed system 126 of suspension of access (e.g., access denied, suspended access, contact resource owner). In another embodiment, event analytics access de-provision 300 sends an e-mail to specified users associated with the suspension of account access (e.g., user id associated with the audit event, manager) and further actions to be taken (e.g., how to reinstate access, suspension of access pending resource owner action, etc.). In some other embodiment, event analytics access de-provision 300 sends an e-mail to the resource owner for review of access for a user through identity manager system 124. In other embodiments, event analytics access de-provision 300 notifies the user id associated with the audit event, managers, and resource owner through a combination of the aforementioned methods of notification. Event analytics access de-provision 300 completes upon the submission of the suspension of account access.

Upon completion of event analytics access de-provision 300, the resource owner of identity manager system 124 performs manual actions in order for permanent role assignments to be implemented for the user id associated with the audit event. In one embodiment, the resource owner, upon review of the results comparison and recommendations made by event analytics access de-provision 300, reinstates user id access. Identity manager system 124 reactivates the user id and restores access to managed system 126. In another embodiment, the resource owner, upon review of the request and recommendations made by event analytics access de-provision 300, modifies the user id roles and assigns a new role based on the results comparison identifying a more similar role based on matching attributes. Identity manager system 124 updates the roles assigned to the user id and restores modified access to managed system 126. In some other embodiment, the resource owner, upon review of the request and recommendations made by event analytics access de-provision 300, revokes access to managed system 126. Identity manager system 124 removes the role associated with the user id, and the user id no longer has access to managed system 126.

Figure 4:
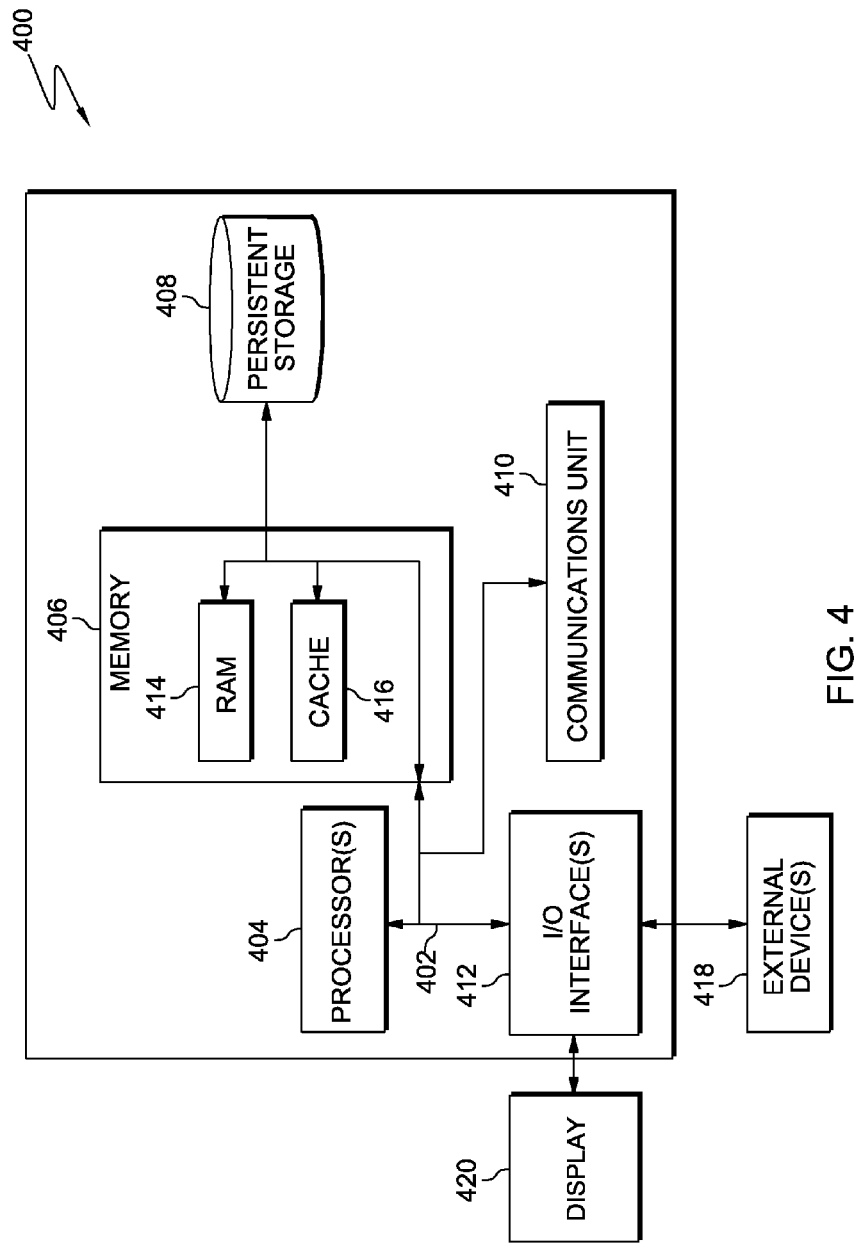
FIG. 4 is a block diagram of components of the server computer of FIG. 1 executing the event analytics access provision of FIG. 2 and the event analytics access de-provision of FIG. 3, in accordance with an embodiment of the present invention.

FIG. 4 depicts a block diagram of components of distributed data processing environment 400, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Distributed data processing environment 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Historical reference 122, identity manager system 124, managed system 126, security intelligence system 128, event analytics access provision 200, and event analytics access de-provision 300 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including computing device 110. In these examples, communications unit 410 includes one or more network interface cards. Communications unit 410 may provide communications through the use of either or both physical and wireless communications links. Historical reference 122, identity manager system 124, managed system 126, security intelligence system 128, event analytics access provision 200, and event analytics access de-provision 300 may be downloaded to persistent storage 408 through communications unit 410.

I/O interface(s) 412 allows for input and output of data with other devices that may be connected to server 120. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., historical reference 122, identity manager system 124, managed system 126, security intelligence system 128, event analytics access provision 200, and event analytics access de-provision 300 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining role-based access, the method comprising:

receiving, by one or more computer processors, an audit event for a restricted resource and a first user id associated with the audit event, wherein the audit event is one or more activities that access data that are recorded and monitored;

determining, by one or more computer processors, the audit event is a failed audit event wherein the first user id associated with the audit event is not able to access the restricted resource;

determining, by one or more computer processors, based at least in part on the audit event, a historical reference from a collection of historical references wherein the determined historical reference includes at least one audit event associated with at least a second user id that includes access to the restricted resource identified by the received audit event, wherein the determined historical reference is a collection of user data associated with at least the second user id that includes one or more attributes describing properties associated with at least the second user id that include at least one or more roles, a department, a manager, and a job code;

determining, by one or more computer processors, access activity associated with the first user id, wherein the access activity is a defined activity for a role associated with the first user id;

determining, by one or more computer processors, based at least in part on the determined historical reference and the access activity associated with the first user id, at least one recommended role for the first user id, wherein the at least one recommended role for the first user id is selected from the one or more roles from the determined historical reference;

creating, by one or more computer processors, an access request for the first user id wherein the access request includes at least a provisioning recommendation and the determined at least one recommended role;

submitting, by one or more computer processors, the access request for the first user id; and in response to submitting the access request for the first user id, providing a submission message.

2. The method of claim 1, further comprises:

determining, by one or more computer processors, one or more attributes for the first user id, wherein the one or more attributes describe properties associated with the first user id that include at least a department, a manager, and a job code; and updating, by one or more computer processors, the collection of historical references with the audit event including the first user id, the determined at least one recommended role, and the one or more attributes.

3. The method of claim 1 further comprising:

determining, by one or more computer processors, whether the determined historical reference includes a minimum threshold of audit events; and responsive to determining the determined historical reference includes the minimum threshold of audit events, determining, by one or more computer processors, one or more roles and one or more attributes associated with at least the second user id of the audit events.

4. The method of claim 1, wherein determining the at least one recommended role further comprises:

determining, by one or more computer processors, one or more attributes for the first user id, wherein the one or more attributes describe properties associated with the first user id that include at least a department, a manager, and a job code;

comparing, by one or more computer processors, the determined one or more attributes of the first user id of the failed audit event with one or more attributes of at least the second user id of at least one audit event within the determined historical reference;

identifying, by one or more computer processors, one or more shared attributes between the one or more attributes of the first used id of the failed audit event and the one or more attributes of at least the second user id of at least the one audit event within the determined historical reference based on the comparison;

creating, by one or more computer processors, an ordered ranking of a plurality of roles from the determined historical reference based on the identified one or more shared attributes, wherein the ordered ranking is organized from most shared attributes to least shared attributes wherein the plurality of roles identify different access rights to the restricted resource; and selecting, by one or more computer processors, the at least one recommended role for the first user id of the failed audit event from the created ordered ranking.

5. The method of claim 1, further comprising:

receiving, by one or more computer processors, a second audit event;

determining, by one or more computer processors, the second audit event is a successful audit event;

retrieving, by one or more computer processors, audit event information associated with the first user id from the collection of historical references, wherein the audit event information includes: a last access attempt, an audit event type, a duration of access, and a frequency of access;

evaluating, by one or more computer processors, the second audit event with respect to the retrieved audit information associated with the first user id from the collection of historical references for compliance with policy rules that define the ways in which the restricted resource is utilized;

determining, by one or more computer processors, whether the evaluated second audit event with respect to the retrieved audit information associated with the first user are compliant with the policy rules;

responsive to determining the evaluated second audit event with respect to the retrieved audit information associated with the first user are compliant with the policy rules, comparing, by one or more computer processors, the retrieved audit event information and one or more attributes of the first user id with one or more audit events information and one or more attributes of at least the second user id within the determined historical reference;

determining, by one or more computer processors, whether the access activity for the first user id is below a set threshold based on a most similar comparison of the retrieved audit event information and one or more attributes of the first user id with one or more audit event information and one or more attributes of at least the second user id within the determined historical reference, wherein the most similar comparison includes the most shared attributes; and in response to determining the access activity for the first user id is below the set threshold, recommending, by one or more computer processors, at least suspending access for the first user id to the restricted resource.

6. The method of claim 1, wherein the collection of user data of at least the second user id includes a user id, a role, a department, a manager, a job code, and a usage of at least the second user id for the restricted resource.

7. A computer program product for determining role-based access, the computer program product comprising:

one or more computer readable storage media and program instructions stored on the one or more computer readable storage media, the program instructions comprising:

program instructions to receive an audit event for a restricted resource and a first user id associated with the audit event, wherein the audit event is one or more activities that access data that are recorded and monitored;

program instructions to determine the audit event is a failed audit event wherein the first user id associated with the audit event is not able to access the restricted resource;

program instructions to determine, based at least in part on the audit event, a historical reference from a collection of historical references wherein, the determined historical reference includes at least one audit event associated with at least a second user id that includes access to the restricted resource identified by the received audit event, wherein the determined historical reference is a collection of user data associated with at least the second user id that includes one or more attributes describing properties associated with at least the second user id that include at least one or more roles, a department, a manager, and a lob code;

program instructions to determine access activity associated with the first user id, wherein the access activity is a defined activity for a role associated with the first user id;

program instructions to determine, based at least in part on the determined historical reference and the access activity associated with the first user id, at least one recommended role for the first user id, wherein the at least one recommended role for the first user id is selected from the one or more roles from the determined historical reference;

program instructions to create an access request for the first user id wherein the access request includes at least a provisioning recommendation and the at least one recommended role;

program instructions to submit the access request for the first user id; and in response to submitting the access request for the first user id, program instructions to provide a submission message.

8. The computer program product of claim 7, further comprising program instructions to:

determine one or more attributes for the first user id, wherein the one or more attributes describe properties associated with the first user id that include at least a department, a manager, and a job code; and update the collection of historical references with the audit event including the first user id, the determined at least one recommended role, and the one or more attributes.

9. The computer program product of claim 7, further comprising program instructions to:

determine whether the determined historical reference includes a minimum threshold of audit events; and responsive to determining the determined historical reference includes the minimum threshold of audit events, determine one or more roles and one or more attributes associated with at least the second user id of the audit events.

10. The computer program product of claim 7, wherein determining the at least one recommended role further comprising program instructions to:
   determine one or more attributes for the first user id, wherein the one or more attributes describe properties associated with the first user id that include at least a department, a manager, and a job code;
   compare the determined one or more attributes of the first user id of the failed audit event with one or more attributes of at least the second user id of at least one audit event within the determined historical reference;
   identify one or more shared attributes between the one or more attributes of the first used id of the failed audit event and the one or more attributes of at least the second user id of at least the one audit event within the determined historical reference based on the comparison;
   create an ordered ranking of a plurality of roles from the determined historical reference based on the identified one or more shared attributes, wherein the ordered ranking is organized from most shared attributes to least shared attributes wherein the plurality of roles identify different access rights to the restricted resource; and
   select the at least one recommended role for the first user id of the failed audit event from the created ordered ranking.

11. The computer program product of claim 7, further comprising program instructions to:
   receive a second audit event;
   determine the second audit event is a successful audit event;
   retrieve audit event information associated with the first user id from the collection of historical references, wherein the audit event information includes: a last access attempt, an audit event type, a duration of access, and a frequency of access;
   evaluate the second audit event with respect to the retrieved audit information associated with the first user id from the collection of historical references for compliance with policy rules that define the ways in which the restricted resource is utilized;
   determine whether the evaluated second audit event with respect to the retrieved audit information associated with the first user are compliant with the policy rules;
   responsive to determining the evaluated second audit event with respect to the retrieved audit information associated with the first user are compliant with the policy rules, compare the retrieved audit event information and one or more attributes of the first user id with one or more audit events information and one or more attributes of at least the second user id within the determined historical reference;
   determine whether the access activity for the first user id is below a set threshold based on a most similar comparison of the retrieved audit event information and one or more attributes of the first user id with one or more audit event information and one or more attributes of at least the second user id within the determined historical reference, wherein the most similar comparison includes the most shared attributes; and
   in response to determining the access activity for the first user id is below the set threshold, recommend at least suspending access for the first user id to the restricted resource.

12. A computer system for determining role-based access, the computer system comprising:
   one or more computer processors;
   one or more computer readable storage media;
   program instructions stored on the computer readable storage media for execution by at least one of the one or more processors, the program instructions comprising:
   program instructions to receive an audit event for a restricted resource and a first user id associated with the audit event, wherein the audit event is one or more activities that access data that are recorded and monitored;
   program instructions to determine the audit event is a failed audit event wherein the first user id associated with the audit event is not able to access the restricted resource;
   program instructions to determine, based at least in part on the audit event, a historical reference from a collection of historical references wherein, the determined historical reference includes at least one audit event associated with at least a second user id that includes access to the restricted resource identified by the received audit event, wherein the determined historical reference is a collection of user data associated with at least the second user id that includes one or more attributes describing properties associated with at least the second user id that include at least one or more roles, a department, a manager, and a job code;
   program instructions to determine access activity associated with the first user id, wherein the access activity is a defined activity for a role associated with the first user id;
   program instructions to determine, based at least in part on the determined historical reference and the access activity associated with the first user id, at least one recommended role for the first user id, wherein the at least one recommended role for the first user id is selected from the one or more roles from the determined historical reference;
   program instructions to create an access request for the first user id wherein the access request includes at least a provisioning recommendation and the at least one recommended role;
   program instructions to submit the access request for the first user id; and
   in response to submitting the access request for the first user id, program instructions to provide a submission message.

13. The computer system of claim 12, further comprising program instructions, stored on the one or more computer readable storage media, to:
   determine one or more attributes for the first user id, wherein the one or more attributes describe properties associated with the first user id that include at least a department, a manager, and a job code; and
   update the collection of historical references with the audit event including the first user id, the determined at least one recommended role, and the one or more attributes.

14. The computer system of claim 12, further comprising program instructions, stored on the one or more computer readable storage media, to:

determine whether the determined historical reference includes a minimum threshold of audit events; and responsive to determining the determined historical reference includes the minimum threshold of audit events, determine one or more roles and one or more attributes associated with at least the second user id of the audit events.

15. The computer system of claim 12, wherein determining the at least one recommended role further comprising program instructions, stored on the one or more computer readable storage media, to:

determine one or more attributes for the first user id, wherein the one or more attributes describe properties associated with the first user id that include at least a department, a manager, and a job code;

compare the determined one or more attributes of the first user id of the failed audit event with one or more attributes of at least the second user id of at least one audit event within the determined historical reference;

identify one or more shared attributes between the one or more attributes of the first used id of the failed audit event and the one or more attributes of at least the second user id of at least the one audit event within the determined historical reference based on the comparison;

create an ordered ranking of a plurality of roles from the determined historical reference based on the identified one or more shared attributes, wherein the ordered ranking is organized from most shared attributes to least shared attributes wherein the plurality of roles identify different access rights to the restricted; and select the at least one recommended role for the first user id of the failed audit event from the created ordered ranking.

16. The computer system of claim 12, further comprising program instructions, stored on the one or more computer readable storage media, to:

receive a second audit event;

determine the second audit event is a successful audit event;

retrieve audit event information associated with the first user id from the collection of historical references, wherein the audit event information includes: a last access attempt, an audit event type, a duration of access, and a frequency of access;

evaluate the second audit event with respect to the retrieved audit information associated with the first user id from the collection of historical references for compliance with policy rules that define the ways in which the restricted resource is utilized;

determine whether the evaluated second audit event with respect to the retrieved audit information associated with the first user are compliant with the policy rules;

responsive to determining the evaluated second audit event with respect to the retrieved audit information associated with the first user are compliant with the policy rules, compare the retrieved audit event information and one or more attributes of the first user id with one or more audit events information and one or more attributes of at least the second user id within the determined historical reference;

determine whether the access activity for the first user id is below a set threshold based on a most similar comparison of the retrieved audit event information and one or more attributes of the first user id with one or more audit event information and one or more attributes of at least the second user id within the determined historical reference, wherein the most similar comparison includes the most shared attributes; and in response to determining the access activity for the first user id is below the set threshold, recommend at least suspending access for the first user id to the restricted resource.

* * * * *